(12) United States Patent
Soisson et al.

(10) Patent No.: US 10,059,815 B2
(45) Date of Patent: Aug. 28, 2018

(54) FILLED ELASTOMERIC COMPOSITE AND PROCESS TO CONTROL COMPOSITE CRUMB SIZE

(71) Applicant: ExxonMobil Chemical Patents Inc., Baytown, TX (US)

(72) Inventors: John P. Soisson, Houston, TX (US); Shawn W. Mowry, Houston, TX (US); Luke P. Stephens, Houston, TX (US); Michael B. Rodgers, Cedar Park, TX (US); Yuan-Ju Chen, Houston, TX (US); Molly W. Upton, Baytown, TX (US); Marvin C. Hill, Spring, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/777,639

(22) PCT Filed: May 3, 2013

(86) PCT No.: PCT/US2013/039536
§ 371 (c)(1),
(2) Date: Sep. 16, 2015

(87) PCT Pub. No.: WO2014/178881
PCT Pub. Date: Nov. 6, 2014

(65) Prior Publication Data
US 2016/0168338 A1    Jun. 16, 2016

(51) Int. Cl.
*C08J 3/21* (2006.01)
*C08K 7/00* (2006.01)
(Continued)

(52) U.S. Cl.
CPC .............. *C08J 3/212* (2013.01); *C08K 3/346* (2013.01); *C08K 7/00* (2013.01); *C08L 23/283* (2013.01);
(Continued)

(58) Field of Classification Search
CPC .... C08K 3/34; C08K 2201/011; C08K 3/346; C08K 7/00; C08L 23/16; C08L 23/22;
(Continued)

(56) References Cited

U.S. PATENT DOCUMENTS 7,514,491 B2    4/2009  Weng et al.
7,605,205 B2   10/2009  Gong et al.
(Continued)

FOREIGN PATENT DOCUMENTS

EP     1 560 879 B      8/2005
WO     WO 2010/044776   4/2010
(Continued)

OTHER PUBLICATIONS

*Rubber Technology*, $3^{RD}$ edition, M. Morton editor, Chpt 10, author Fusco et al (1999, Springer Science).
(Continued)

*Primary Examiner* — Satya B Sastri
(74) *Attorney, Agent, or Firm* — Priya G. Prasad

(57) ABSTRACT

To obtain an elastomeric composite crumb having a majority of the particle size distribution greater than 0.33 cm, the crumb is obtained by a process whereby the elastomeric composite comprises less than about 0.5 phr of a salt of a $C_8$ to $C_{20}$ carboxylic acid, or 10 to 20 phr of a tackifying resin or a combination of both an absence of carboxylic acid and the presence of the tackifying resin. The use of one or both methods permits control of crumb particle size distribution
(Continued)

in emulsion or solution processes for producing elastomeric nanocomposites. The elastomeric composite is also disclosed.

9 Claims, 2 Drawing Sheets

(51) Int. Cl.
*C08K 3/34* (2006.01)
*C08L 23/28* (2006.01)
*C08L 25/16* (2006.01)
*C08J 3/215* (2006.01)
*C08J 3/20* (2006.01)

(52) U.S. Cl.
CPC .............. *C08L 25/16* (2013.01); *C08J 3/20* (2013.01); *C08J 3/21* (2013.01); *C08J 3/215* (2013.01); *C08J 2323/28* (2013.01); *C08J 2325/16* (2013.01); *C08L 2205/06* (2013.01)

(58) Field of Classification Search
CPC .... C08L 23/283; C08L 25/16; C08L 2205/06; C08L 2666/02; B82Y 30/00; C08J 2323/22; C08J 2323/28; C08J 3/21; C08J 3/215; C08J 5/005; C08J 3/20
See application file for complete search history.

(56) References Cited

U.S. PATENT DOCUMENTS

| | | | |
|---|---|---|---|
| 8,242,236 B2* | 8/2012 | Soisson | B60C 1/00 428/411.1 |
| 2007/0219304 A1* | 9/2007 | Weng | B82Y 30/00 524/445 |
| 2009/0005493 A1* | 1/2009 | Tse | B60C 1/0008 524/502 |
| 2010/0036037 A1 | 2/2010 | Osman et al. | |
| 2011/0250372 A1* | 10/2011 | Weng | B60C 1/0008 428/36.6 |

FOREIGN PATENT DOCUMENTS

| | | | |
|---|---|---|---|
| WO | 2011/025276 A | 3/2011 | |
| WO | WO 2011/149603 | 12/2011 | |
| WO | WO 2011149603 A1 * | 12/2011 | ............... B60C 1/00 |

OTHER PUBLICATIONS

*Rubber Nanocomposites: Preparation, Properties and Applications,* editors Thomas et al., Chpt 7, author Gatos, et al (2010, J.Wiley).

* cited by examiner

Effect of Carboxylic Acid Salt on Crumb Particle Size Distribution

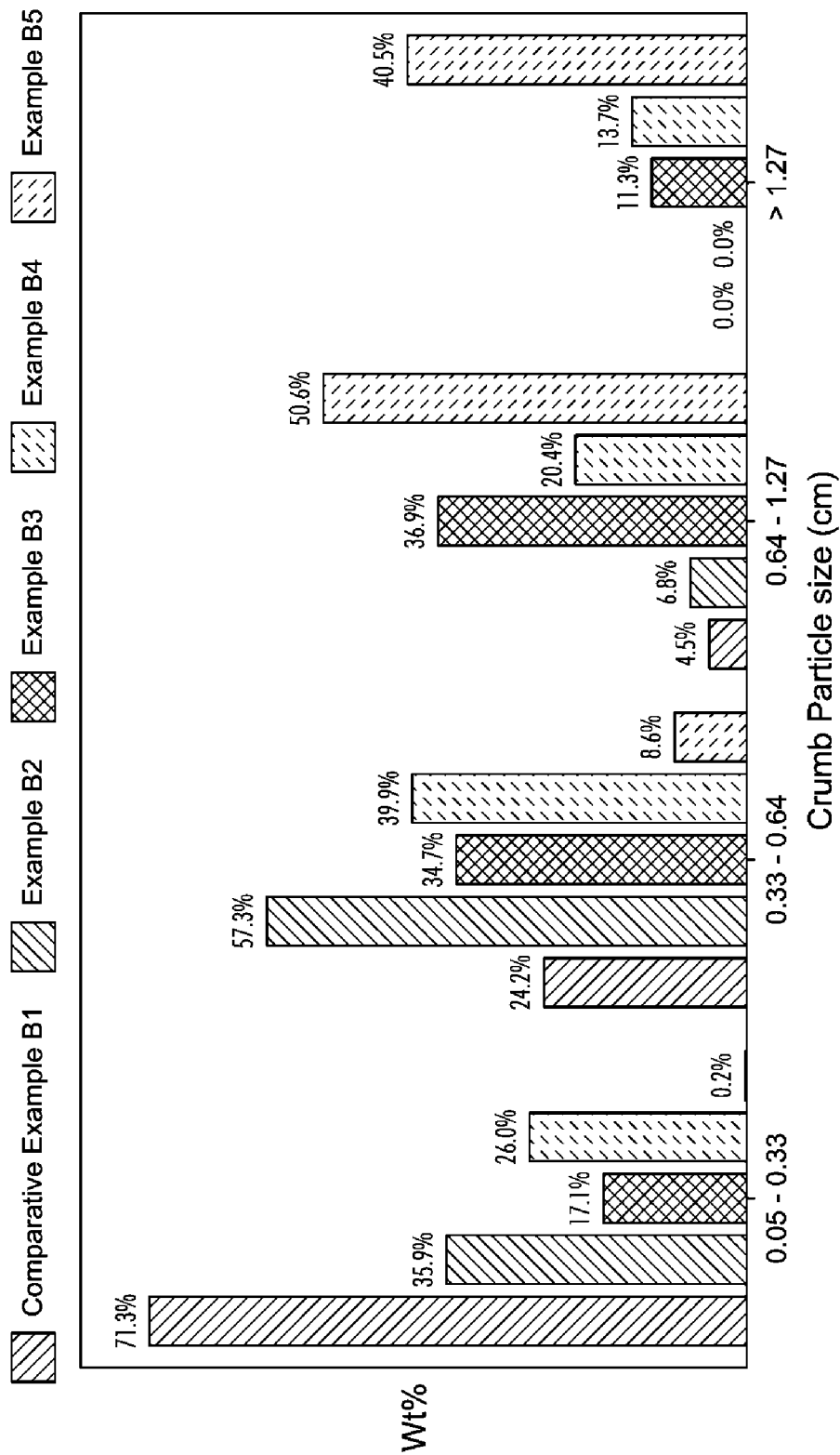

FILLED ELASTOMERIC COMPOSITE AND PROCESS TO CONTROL COMPOSITE CRUMB SIZE

PRIORITY CLAIM TO RELATED APPLICATIONS

This application is a National Stage Application of International Application No. PCT/US2013/039536, filed May 3, 2013, the disclosure of which is fully incorporated herein by reference in its entirety.

FIELD OF THE INVENTION

The instant disclosure is generally related to a method of producing elastomeric composites, producing elastomeric nanocomposites, the elastomeric composites produced, and controlling the particle size distribution of the elastomeric composites produced.

BACKGROUND OF THE INVENTION

Elastomeric composites have improved properties over the elastomers, and are suitable for many uses including articles requiring impermeability features, such as tire innerliners, tire innertubes, tire curing bladders, hoses, medical stoppers, impermeability sheets, and other similar items.

Production of elastomeric composites in general and elastomeric nanocomposites in particular, generally results in the precipitation of the composite to form particulates referred to in the art as a "crumb". In regards to rubber, the term 'crumb' is also used to refer to granulated scrap tires or other granulated scrap rubber. For the purpose of the present invention, the term 'crumb' is restricted to the particulates of polymer/elastomer and elastomeric composites obtained from a polymerization process or a liquid based mixing process and not from granulating scrap articles or already manufactured rubber.

The size distribution of the crumb obtained from polymerization and/or mixing directly affects the processability of the composite, wherein excessively small crumb having a nominal diameter of less than about 0.33 cm, or excessively large crumb having a nominal diameter of greater than about 3.5 cm results in process difficulties due to plugging of equipment, reduced product recovery, increased dry time, lower throughput rates, and other issues. Elastomeric nanocomposites tend to form the excessively smaller crumb size, rendering the continued handling of the composite crumb difficult and reducing the viability of production of such a product, despite such materials having known improved properties over non-reinforced elastomeric materials.

While small scale laboratory work with very small crumb can be managed, there exists the need to develop a method to increase the crumb size of elastomeric composites preferably for both in-situ production of the elastomeric composite and for laboratory creation of elastomeric composites using already produced elastomeric polymer.

SUMMARY OF THE INVENTION

The instant application is generally directed to a process to produce an elastomeric composite, which may be a nanocomposite. The elastomeric composite produced according to the instant disclosure has improved capabilities for use in articles requiring impermeability features, such as tire innerliners, tire innertubes, tire curing bladders, hoses, medical stoppers, impermeability sheets, and other similar items.

Disclosed herein is a process comprising polymerizing one or more olefins in the presence of a catalyst to obtain a polymer via solution polymerization or slurry polymerization. The polymer is dissolved in a solvent under conditions suitable to produce a cement and a filler is dispersed in the cement to produce an elastomeric composite cement. The elastomeric composite cement is contacted with water to produce a solvent-rich slurry comprising the elastomeric composite, the solvent, and water. The solvent-rich slurry is then stripped with water, steam, or a combination thereof to produce a solvent-lean slurry comprising a crumb of the elastomeric composite, wherein the solvent-lean slurry, and the crumb therein, is essentially free from, or comprises less than about 0.5 phr of a salt of a $C_8$ to $C_{20}$ carboxylic acid.

Also disclosed herein is a process comprising polymerizing one or more olefins in the presence of a catalyst to obtain an elastomeric polymer via solution polymerization or slurry polymerization. The polymer is dissolved in a solvent under conditions suitable to produce a cement, a filler is dispersed in the cement to produce an elastomeric composite cement. The elastomeric composite cement is contacted with water to produce a solvent-rich slurry comprising the elastomeric composite and the solvent. The solvent-rich slurry is stripped with water, steam, or a combination thereof to produce a solvent-lean slurry comprising a crumb of the elastomeric composite. To the cement, the elastomeric composite cement; the solvent-rich slurry, the solvent lean slurry, or any combination thereof, a tackifying resin is added in an amount from about 0.5 to 20 phr.

The process disclosed herein may further comprise any one or any combination of the following aspects:
the solvent-rich slurry may consist essentially of the cement and water, and optionally the tackifying resin;
the tackifying resin may comprise an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof;
the tackifying resin may have a glass transition temperature that is greater than a glass transition temperature of the elastomeric composite, wherein the tackifying resin has a softening point of less than 125° C., or a combination thereof;
the crumb particle size distribution may comprise less than 50 weight percent of particles having a particle size of less than 0.33 cm;
the crumb particle size distribution may comprise less by weight of particles having a size less than 0.3 cm than particles having a size from about 0.33 to 1.3 cm;
drying the solvent-lean slurry to a moisture level below 1 phr;
the elastomeric composite produced may comprise, or may be an elastomeric nanocomposite; and/or
the crumb particle size distribution comprises less than 50 weight percent of particles having a particle size of less than 0.33 cm.

Also disclosed herein is an elastomeric composite comprising less than about 0.5 phr, or which is essentially free of a salt of a $C_8$ to $C_{20}$ carboxylic acid; comprising from about 0.5 to about 20 phr of a tackifying resin; or a combination thereof.

In an embodiment, the elastomeric composite produced according to the instant disclosure may further any one or any combination of the following aspects:

an elastomeric nanocomposite;

the elastomer comprises isobutylene rubber, halogenated isobutylene rubber, butyl rubber, halogenated butyl rubber, star-branched butyl rubber, halogenated star-branched butyl rubber, isobutylene-co-p-methylstyrene rubber, halogenated isobutylene-co-p-methylstyrene rubber, natural rubber, isoprene rubber, epoxylated natural rubber, styrene butadiene rubber, hydrogenated styrene butadiene rubber, polybutadiene rubber, nitrile butadiene rubber, hydrogenated nitrile butadiene rubber, ethylene propylene rubber, ethylene propylene diene rubber, maleic acid-modified ethylene propylene rubber, acrylic rubber, chloroprene rubber, hydrin rubber, chlorosulfonated polyethylene rubber, chlorinated polyethylene rubber, maleic acid-modified chlorinated polyethylene rubber, methylvinyl silicone rubber, dimethyl silicone rubber, methylphenylvinyl silicone rubber, polysulfide rubber, vinylidene fluoride rubber, tetrafluoroethylene-propylene rubber, fluorine-containing silicone rubber, acrylonitrile-butadiene rubber, or combinations thereof;

a nanofiller comprising silicates, graphite, graphenes, carbon nanotubes, expandable graphite oxides, carbonates, nanoclays, metal oxides, talcs, or a combination thereof, wherein the nanofiller has a maximum dimension in the range of from about 0.0001 nm to about 100 nm; a crumb particle size distribution comprises less than 50 weight percent of particles having a particle size of less than 0.33 cm;

a crumb particle size distribution comprises less by weight of particles having a size less than 0.3 cm than particles having a size from about 0.33 to 1.3 cm;

the crumb particle size distribution comprises less than 50 weight percent of particles having a particle size of less than 0.33 cm; and/or the elastomeric composite has a moisture level below 1 phr.

BRIEF DESCRIPTION OF THE DRAWINGS

The disclosure will be more clearly understood from the following detailed description taken in conjunction with the accompanying drawings in which:

FIG. 2 is a graph showing the particle size distribution of an inventive and a comparative example according to another embodiment of the instant disclosure.

DETAILED DESCRIPTION

Figure 1:
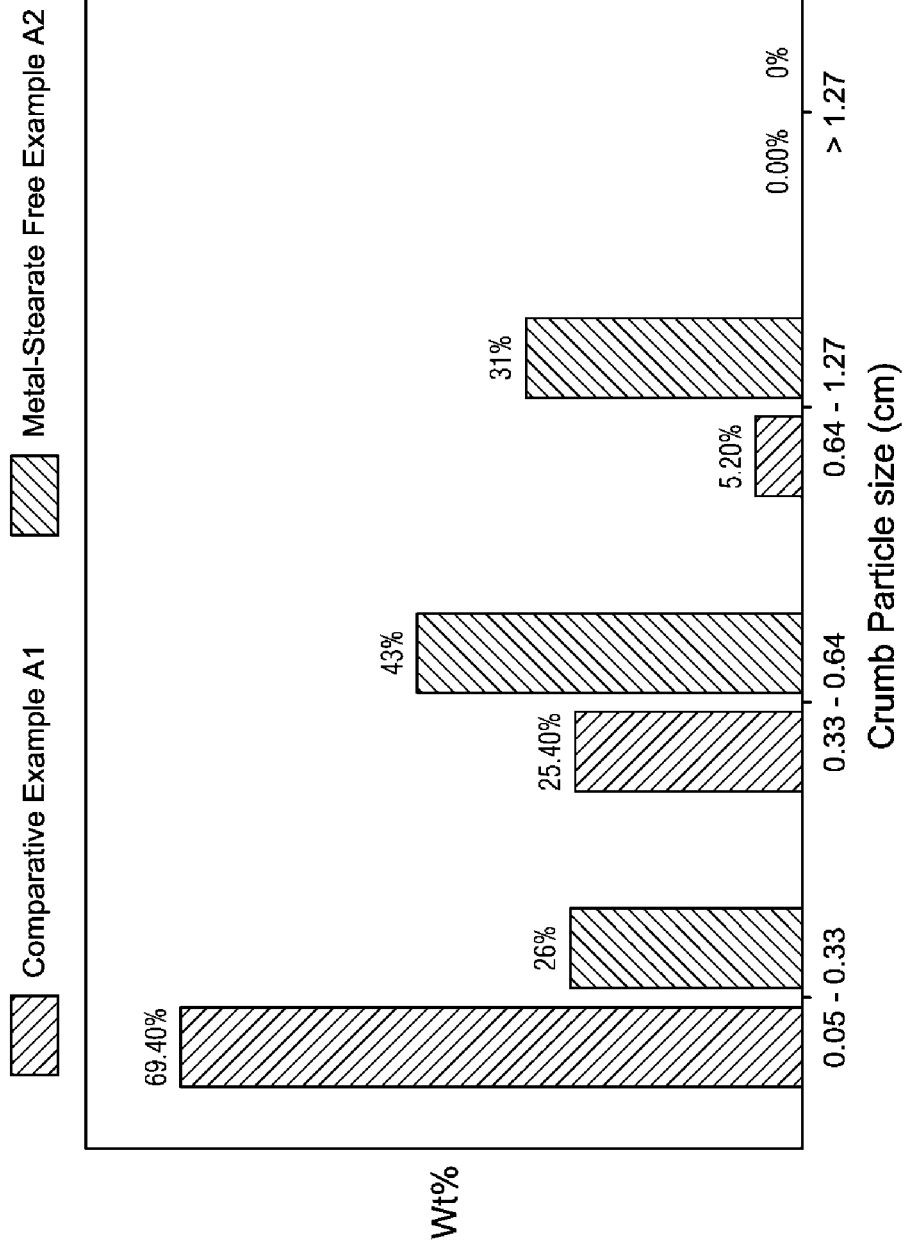
FIG. 1 is a graph showing the particle size distribution of an inventive and a comparative example according to an embodiment of the instant disclosure.

Various specific embodiments, versions, and examples will now be described, including embodiments and definitions that are adopted herein for purposes of understanding instant disclosure. While the illustrative embodiments have been described with particularity, it will be understood that various other modifications will be apparent to and can be readily made by those skilled in the art without departing from the spirit and scope of the disclosure. For determining infringement, the scope of the instant disclosure will refer to any one or more of the appended claims, including their equivalents and elements or limitations that are Definitions Definitions applicable to the instant disclosure include the following as described herein.

The term "elastomer" is used interchangeably with rubber and elastomeric polymer, and refers to any polymer or composition of polymers consistent with the ASTM D1566 definition: "a material that is capable of recovering from large deformations, and can be, or already is, modified to a state in which it is essentially insoluble (but can swell) in boiling solvent . . . ".

The term "elastomeric composite" refers to any composition comprising at least one filler dispersed within at least one elastomer as defined above.

The term "multiolefin" refers to any olefin monomer having two or more unsaturations (typically double bonds), for example, a multiolefin may be any monomer comprising two conjugated double bonds, such as a conjugated diene, e.g. isoprene.

The term "styrene" monomer refers to unsubstituted or substituted styrene, as further detailed below. Specifically, alkylstyrene is one type of substituted styrene.

The term "butyl rubber" refers to C4-C7 isoolefin derived rubber wherein there is a commercial preference for isobutylene based butyl rubber, and "isobutylene-based rubber" means rubber containing at least 70 mol % isobutylene units, based on the total amount of monomer units in the rubber.

The term "nanocomposite" or "nanocomposite composition" refers to polymer systems containing inorganic particles (so-called "nanofillers") with at least one dimension (such as the thickness) in the nanometer range, i.e., from about 1 to about 100 nm, dispersed within a polymer matrix.

The term "intercalation" refers to the state of a composition in which a polymer is present between the layers of a platelet filler. As is recognized in the industry and by academia, some indicia of intercalation can be the shifting and/or weakening of detection of X-ray lines as compared to that of original platelet fillers, indicating a larger spacing between clay layers than in the original mineral.

The term "exfoliation" refers to the separation of individual layers of the original inorganic particle, so that polymer can surround or surrounds each particle. If sufficient polymer is present between the platelets, the platelets can be randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

The term "solvent" refers to any substance or mixture of substances capable of dissolving another substance. When the term "solvent" is used it may refer to at least one solvent or two or more solvents unless specified. Generally, solvents can be polar or unpolar.

The term "solution" refers to a uniformly dispersed mixture at the molecular level or ionic level, of one or more substances (solute) in one or more substances (solvent). When a polymer, including elastomeric polymers of the type contemplated herein, are dissolved in a solvent, the resulting solution is conventionally referred to as a "cement."

The term "suspension" or "slurry" (which terms are used interchangeably herein) refers to a system consisting of a solid dispersed in a solid, liquid, or gas, usually in particles of larger than colloidal size.

The term "emulsion" refers to a system consisting of a liquid or liquid suspension dispersed in another immiscible liquid usually in droplets of larger than colloidal size.

The term "nanofillers" include nanoclays have a maximum dimension in the range of from about 0.0001 micrometer to about 100 micrometer. The other characteristic of a nanofiller in general, and a nanoclay in particular, is the high ratio of surface area to volume as is readily understood by one having minimal skill in the art; which is in distinction to a fine grain carbon black that might have a very small maximum dimension but which has a low ratio of surface area to volume per particle. This high ratio of surface area to volume e.g., greater than or equal to about 30 $(m^2/g)$: $cm^3$ provides the nanofiller with a sheet-like or hollow-rod like structure.

A "vulcanized rubber compound" by ASTM D1566 definition refers to "a crosslinked elastic material compounded from an elastomer, susceptible to large deformations by a small force capable of rapid, forceful recovery to approximately its original dimensions and shape upon removal of the deforming force". A cured elastomeric composition refers to any elastomeric composition that has undergone a curing process and/or comprises or is produced using an effective amount of a curative or cure package, and is a term used interchangeably with the term vulcanized rubber compound.

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is always defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percent for every component after adjusting levels of only one, or more, component(s).

"Alkyl" refers to a paraffinic hydrocarbon group which may be derived from an alkane by dropping one or more hydrogens from the formula, such as, for example, a methyl group ($CH_3$), or an ethyl group ($CH_3CH_2$), and the like.

"Substituted" refers to at least one hydrogen group being replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, isopropyl, normal butyl, isobutyl, secondary butyl, tertiary butyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-dibromobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

Elastomers

In an embodiment, elastomers suitable for use herein include isobutylene rubber, halogenated isobutylene rubber, butyl rubber, halogenated butyl rubber, star-branched butyl rubber, halogenated star-branched butyl rubber, isobutylene-co-p-methylstyrene rubber, halogenated isobutylene-co-p-methylstyrene rubber, natural rubber, isoprene rubber, epoxylated natural rubber, styrene butadiene rubber, hydrogenated styrene butadiene rubber, polybutadiene rubber, nitrile butadiene rubber, hydrogenated nitrile butadiene rubber, ethylene propylene rubber, ethylene propylene diene rubber, maleic acid-modified ethylene propylene rubber, acrylic rubber, chloroprene rubber, hydrin rubber, chlorosulfonated polyethylene rubber, chlorinated polyethylene rubber, maleic acid-modified chlorinated polyethylene rubber, methylvinyl silicone rubber, dimethyl silicone rubber, methylphenylvinyl silicone rubber, polysulfide rubber, vinylidene fluoride rubber, tetrafluoroethylene-propylene rubber, fluorine-containing silicone rubber, acrylonitrile-butadiene rubber, or combinations thereof.

In an embodiment, the elastomer, which may also be referred to herein simply as the polymer, in the elastomeric composite, or the composite for brevity, may generally be any elastomer (or elastomeric blend) suitable as a polymer matrix to form a composite, or a nanocomposite with a nanofiller, which may include exfoliated clay. In an embodiment, the elastomer used may or may not comprise halogenated polymers. In an embodiment, the elastomer suitable for use herein may be functionalized or unfunctionalized.

In an embodiment, the composite may include at least one halogenated elastomer comprising C4 to C7 isoolefin-derived units. The isoolefin may be a C4 to C6 compound, such as isobutylene, 2-methyl-1-butene, 3-methyl-1-butene, 2-methyl-2-butene, and/or 4-methyl-1-pentene.

In an embodiment, the elastomer may comprise other monomer derived units, such as styrenic units and/or multiolefinic units. In an embodiment, the halogenated elastomer comprises at least one styrenic monomer, which may be any substituted styrene monomer unit, and which may include styrene, alpha-methylstyrene, ortho, meta, or para alkylstyrene, the alkyl being selected from any C1 to C5 linear or branched alkyl. In an embodiment, the elastomer comprises para-methylstyrene. In an embodiment, the halogenated elastomer includes an isoolefin derived monomer, a multiolefin derived monomer and/or a styrene derived monomer.

In an embodiment, the halogenated elastomer component is a halogenated copolymer of a C4 to C7 isoolefin and a multiolefin. The multiolefin may be a C4 to C14 conjugated diene such as isoprene, butadiene, 2,3-dimethyl-1,3-butadiene, myrcene, 6,6-dimethyl-fulvene, cyclopentadiene, hexadiene and piperylene. In an embodiment, the polymer is obtained by reacting 92 to 99.5 weight % of isobutylene with 0.5 to 8 weight % isoprene, or 95 to 99.5 weight % isobutylene with 0.5 to 5.0 weight % isoprene, and thereafter halogenating the polymer.

Non-limiting commercial examples of suitable halogenated isoolefin/multiolefin rubbers for use herein include Bromobutyl 2222 and Bromobutyl 2255 (both available from ExxonMobil Chemical Company).

In an embodiment, the elastomer comprises a random elastomeric copolymers of a C4 to C7 isoolefin, such as isobutylene, and a para-alkylstyrene comonomer, para-methylstyrene, containing at least 80%, or at least 90% by weight of the para-isomer. In an embodiment, interpolymers of isobutylene and para-methylstyrene containing from 0.5 to 20 mol % para-methylstyrene, wherein up to 60 mol % of the methyl substituent groups on the phenyl ring contain a bromine or a chlorine atom. These elastomers are abbreviated here as "BIMS".

In an embodiment, BIMS polymers have a substantially homogeneous compositional distribution such that at least 95% by weight of the polymer has a para-alkylstyrene content within 10% of the average para-alkylstyrene content of the polymer. In an embodiment, the polymers may also be characterized by a narrow molecular weight distribution (Mw/Mn) of less than 5, or less than 2.5, with a viscosity average molecular weight in the range of from 200,000 up to 2,000,000 and a number average molecular weight in the range of from 25,000 to 750,000 as determined by gel permeation chromatography.

BIMS polymers suitable for use herein may be prepared according to methods known in the art by a slurry polymerization of the monomer mixture using a Lewis acid catalyst, followed by halogenation, preferably bromination, in solution in the presence of halogen and a radical initiator such as heat and/or light and/or a chemical initiator.

In an embodiment, BIMS polymers may be brominated to contain from 0.1 to 5 mol % of bromomethylstyrene groups relative to the total amount of monomer derived units in the polymer from 0.2 to 3.0 mol %, or from 0.3 to 2.8 mol %, or from 0.3 to 2.5 mol %, or from 0.4 to 2.0 mol %, wherein a range may be any combination of any upper limit with any lower limit Expressed another way, suitable BIMS polymers may contain from 0.2 to 10 weight % of bromine, based on the weight of the polymer, or from 0.4 to 6 weight % of bromine, or from 0.6 to 5.6 weight % of bromine, and may be substantially free of ring halogen or halogen in the polymer backbone chain. In an embodiment, the polymer is a copolymer of C4 to C7 isoolefin derived units, para-methylstyrene derived units and para-(halomethyl)styrene derived units, wherein the para-(halomethyl)styrene units are present at from 0.4 to 3.0 mol % based on the total number of para-methylstyrene, and wherein the para-methylstyrene derived units are present from 3 weight % to 15 weight %, or from 4 weight % to 10 weight % based on the total weight of the polymer.

In an embodiment, the elastomer may be a branched or "star-branched" halogenated butyl rubber. In an embodiment, the star-branched halogenated butyl rubber ("SBHR") is a composition of a butyl rubber, either halogenated or not, and a polydiene or block copolymer, either halogenated or not. The polydiene/block copolymer or branching agents (hereinafter "polydienes"), are typically cationically reactive and are present during the polymerization of the butyl or halogenated butyl rubber, or can be blended with the butyl or halogenated butyl rubber to form the SBHR. In an embodiment, the SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the total monomer weight content, in greater than 0.3 weight % in one embodiment, or from 0.3 to 3 weight %, or from 0.4 to 2.7 weight %. A non-limiting commercial embodiment of an SBHR suitable for use herein is Bromobutyl 6222 (Exxon-Mobil Chemical Company).

In an embodiment, the halogenated elastomers as referred to above are produced by the halogenation of the underlying backbone elastomers (i.e., the corresponding unhalogenated elastomers). Halogenation can be carried out by any means known in the art. For example, the elastomer can be halogenated in hexane diluent at from 40 to 60° C. using bromine ($Br_2$) or chlorine ($Cl_2$) as the halogenation agent. The halogenated elastomer may generally have a Mooney Viscosity of from 25 to 65 (ML 1+8 at 125° C.), or from 30 to 55. The halogen content may generally be from 0.1 to 10 weight %, or from 0.5 to 5 weight %, or from 1 to 2.2 weight %, based on the total weight of the halogenated elastomer.

Elastomeric polymers, including butyl polymers, may be made in either a slurry polymerization process or a solution process. In slurry polymerization, the monomers forming the polymer may be either dissolved or suspended in the appropriate liquid diluent and as polymerization progress, the formed polymer is a solid suspended in the polymerization medium. For those slurry polymerizations wherein the monomers are dissolved in diluent, the formed polymer will precipitate out of suspension thereby forming the slurry. In solution polymerization, the diluent is selected such that monomers and the resulting polymer stay suspended in solution.

After formation of the polymer in a slurry polymerization process, if the polymer is to be further functionalized in a solvent system, the polymer will be separated from the polymerization medium by various known methods and then dissolved in a desired solvent to form a cement. For further functionalization of polymer formed in a solution process, if the polymerization solvent is acceptable for use in the additional reaction or mixing of the polymer, the polymerization medium containing the dissolved solvent may be treated to neutralize and remove remaining monomers and catalysts to prevent from further polymer polymerization. After any such neutralization and removal steps, the resulting polymer cement is then used in the next desired process step.

The organic solvent for dissolving the formed elastomeric polymer according to the processes of the instant disclosure can be any suitable hydrocarbon solvent that sufficiently dissolves the polymer to be used in the process of preparing the composite. The organic solvent may also be a mixture of different hydrocarbons.

In an embodiment, the solvents may comprise one or more alkanes, alkenes, aromatics, nitrated alkanes, halogenated alkanes, ethers, or mixtures thereof. The solvent may comprise one or more $C_2$ to $C_{40}$, or $C_4$ to $C_{15}$ linear, branched or cyclic alkanes, alkenes, aromatics or ethers. In an embodiment, the solvent may comprise hexane, isohexane, cyclohexane, toluene, tetrahydrofuran, butane, isobutene, pentane, octane, isooctane, nonane, decane, undecane, dodecane, isododecane, any isomers thereof and any mixtures thereof.

In an embodiment, the elastomer cement may have organic solvent content in the range of from 30 to 99 weight %, or from 50 to 99 weight %, or from 70 to 99 weight %, or from 80 to 99 weight %, based upon the total weight of the cement.

Layered Fillers and Nanofillers

In an embodiment, the filler may comprise silicates, clays, modified clays, organic clays, graphenes, graphite oxides, carbonates, metal oxides, talc, and combinations thereof. In an embodiment, the filler comprises a nanofiller comprising silicates, graphite, graphenes, carbon nanotubes, expandable graphite oxides, carbonates, nanoclays, metal oxides, talcs, or a combination thereof, wherein the nanofiller has a maximum dimension in the range of from about 0.0001 μm to about 100 μm.

In an embodiment, the composite includes a layered filler, and in a preferred embodiment, the layered filler is a swellable layered clay. In an embodiment, the filler is a swellable layered nanoclay. The particles of a nanoclay have at least one dimension in the nanometer range (i.e., from about 1 to about 100 nm). In an embodiment, the nanocomposite compositions comprise clays which are well dispersed within the elastomer and exfoliated. Swellable layered clay materials suitable for use herein include natural or synthetic phyllosilicates, particularly smectic clays such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite and the like. These layered clays generally comprise silicate particles or platelets in the nanometer range, tightly bound together at interlayer spacings of e.g. 4 angstroms or less. The layered clays comprise particles or platelets of less than 20 nm average thickness, or less than 10 nm, or less than 5 nm, or less than 3 nm, such as from 5 to 20 angstroms, or from 8 to 12 angstroms as measured by Transmission Electron Microscopy (TEM). These particles may have an aspect ratio (length to thickness ratio) of greater than or equal to about 100. The clays may further contain naturally occurring exchangeable cations such as $Na^+$, $Ca^{2+}$, $K^+$ or $Mg^{2+}$ present at the interlayer surfaces.

The nanoclays useful in the invention may be classified as inorganic, as opposed to organoclays, as the layered clays have not been modified by exchange of the naturally occurring cations by organic cations such as those derived from organic ammonium salts. Rather, the inorganic clays are used in their inorganic, unmodified form. For example, sodium montmorillonite clay such as Cloisite Na+ is used slurried in water without any prior organic modification. In an embodiment, a modifier which serves as bifunctional emulsifier-exfoliator may be used with the layered clay, which may be protonated in-situ by addition of a Bronsted acid while being in contact with the unmodified clay and the elastomer.

In an embodiment, layered clay may be suspended in water to form the aqueous clay slurry. In other embodiments, the clay is slurried in an organic solvent prior to contacting with the elastomer cement. In an embodiment, the concentration of clay in water, or the solvent is sufficiently low to minimize the interaction between the clay particles and to increase exfoliation of the clay. In an embodiment, the aqueous or solvent slurry of clay can have a clay concentration of between 0.1 and 5.0 weight %, or between 0.1 and 3.0 weight %, based on the total weight of the slurry.

The amount of filler, e.g., exfoliated clay, incorporated in the composite is selected to be sufficient to develop an improvement in the mechanical properties and/or barrier properties of the composite, for example, tensile strength and/or air barrier properties. Amounts of filler, which may include nanofiller, may range from 0.1 to 20 weight %, or from 0.2 to 15 weight %, or from 0.5 to 10 weight %, or from 1 to 6 weight % based on the rubber content of the nanocomposite. Independently thereof, expressed in parts per hundred rubber, the clay or other filler or nanofiller may be present at from 1 to 45 phr in one embodiment, or from 2 to 20 phr, or from 3 to 11 phr.

Process of Preparing the Composite

Elastomeric composites in accordance with the invention can be formed using emulsion blending or solution blending. This is distinct from known melt blending wherein melt blending is done by masticating the elastomer to a melt point and blending the layered filler into the heated, melted polymer. The present invention requires the use of at least one solvent in sufficient quantities to form a cement and enable blending of the polymer and the layered filler in a liquid medium.

In an emulsion process, a composite is produced by a process comprising contacting an aqueous solution comprising water and at least one layered filler with an elastomer cement comprising an elastomer dissolved in a solvent under agitation to produce a solvent-rich elastomeric composite emulsion. The emulsion is solvent-rich as the volume of water used with the layered filler is less than the volume of solvent in the elastomeric cement. The solvent-rich emulsion is then contacted with water and/or steam and steam stripped to remove the solvent and precipitate the elastomeric composite, producing a solvent-lean slurry. The elastomeric composite precipitates from the emulsion as a crumb having a particle size distribution. In an embodiment, the composite is produced by contacting the elastomer cement and the layered filler slurry in the presence of an emulsifier or surfactant.

The emulsions are formed by subjecting a mixture of the cement and the clay or other filler slurry to sufficient shear, as in a commercial blender or its equivalent for a period of time sufficient for forming the emulsion, e.g., generally at least a few seconds. The emulsion can be allowed to remain in emulsion form, with or without continuous or intermittent mixing or agitation, with or without heating or other temperature control, for a period sufficient to enhance exfoliation of the layered filler, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. In an embodiment, the amount of surfactant employed is at least 0.001 weight percent of the total emulsion, or about 0.001 to about 3 weight percent, or 0.01 to less than 2 weight percent. Suitable surfactants include cationic surfactants including tertiary amines, diamines, polyamines, amines, as well as quaternary ammonium compounds. Non-ionic surfactants useful in preparing the emulsions include alkyl ethoxylates, linear alcohol ethoxylates, alkyl glucosides, amide ethoxylates, amine ethoxylates (coco, tallow, and oleyl amine ethoxylates for example), alkyl phenol ethoxylates, and nonyl phenol ethoxylates.

In a solution blending process, a composite is produced by contacting an elastomeric cement with at least one layered filler or clay slurried in a solvent, which may be the same or different from the solvent forming the elastomeric cement, but which is typically the same solvent, under agitation, to produce an elastomeric composite cement. After sufficient agitation, the composite cement is steam stripped or hot water stripped to remove the solvent and precipitate the elastomeric composite thereby producing a solvent-lean slurry comprising a crumb of the elastomeric composite.

The crumb produced by the emulsion and solvent processes has a crumb particle size distribution. Crumb size must be controlled to prevent plugging of equipment due to excessively large crumb (e.g., having a maximum dimension of greater than 3.5 mm) Conversely, excessively small crumb size (e.g., having a maximum dimension of less than 0.33 cm) impairs polymer recovery, dewatering, drying, and other process concerns. For unfilled elastomers in cements or emulsions, it is typical to include an amount of a salt of a $C_8$ to $C_{20}$ carboxylic acid, typically a metal stearate, most typically calcium or zinc stearate, during the stripping process to control elastomeric crumb size and control crumb tackiness, i.e. prevent agglomeration of the crumb; see *Rubber Technology 3$^{rd}$ Edition*, M. Norton, pg 285.

However, it was noticed that when producing various elastomeric filler reinforced composites, the elastomeric composites tend to form smaller particles/crumb than conventional non-reinforced polymer crumb, and smaller than desirable or workable crumb during the stripping operation, the reverse of a conventional elastomeric process. While not wishing to be bound by theory, it is believed that a portion of the layered filler is exposed or deposited on the surface of the precipitating elastomeric composite particles. This exposed filler reduces the tackiness of the precipitating polymer and reduces its tendency to agglomerate with other emerging crumb particles. This relatively small crumb size makes commercial in-situ production of elastomeric composites using a conventional elastomeric processes challenging due to the already noted issues. However, it has been discovered that the crumb size and the crumb size of the crumb particle size distribution can be increased, i.e. improved, by several methods that may be used separately or together.

The first method is the exclusion of carboxylic acid salts, specifically the exclusion of stearates, more preferably the exclusion of metal stearates from the in-situ production process of forming the elastomeric composite. The exclusion of these compounds, known to reduce tackiness of non-reinforced elastomeric crumb actually mitigates the creation of small crumb size. This process improves the crumb size in general, and increases the crumb size of the crumb particle size distribution. In an embodiment using the first method, a process comprises:

(a) polymerizing one or more olefins in the presence of a catalyst to obtain an elastomeric polymer;
(b) obtaining a cement comprising the elastomeric polymer in a solvent;
(c) dispersing a layered filler in the cement wherein the layered filler is slurried in either a solvent or water thereby creating an elastomeric composite mixture of either an elastomeric composite cement or a solvent-rich elastomeric composite emulsion; and
(d) stripping the mixture with water, steam, or a combination thereof to produce a solvent-lean slurry comprising a crumb of the elastomeric composite, wherein the solvent-lean slurry is essentially free from, or comprises less than about 0.5 phr of a salt of a $C_8$ to $C_{20}$ carboxylic acid.

In an embodiment, the solvent-lean slurry is essentially free, or comprises less than about 0.5 phr, of calcium stearate. In an embodiment, no additional surfactant is added to the elastomeric composite cement.

It was further discovered that excluding carboxylic acid salts, and in particular excluding metal stearates, produces an elastomeric nanocomposite having lower gas permeability than a corresponding elastomeric nanocomposite produced essentially identically, utilizing a solvent-lean slurry comprising greater than 0.5 phr of conventional anti-agglomeration additives such as zinc stearate or calcium stearate. Accordingly, in an embodiment, the elastomeric nanocomposite produced according to the instant disclosure comprises a lower gas permeability than an identically produced, or an essentially identically produced elastomeric nanocomposite produced utilizing a solvent-lean slurry comprising greater than 0.5 phr of calcium stearate.

The second method of improving the crumb size, which may be practiced with or without the above first method, is the inclusion of a tackifying resin during in-situ production of the elastomeric composite. In an embodiment using only the second method, the process comprises:

(a) polymerizing one or more olefins in the presence of a catalyst to obtain an elastomeric polymer;
(b) obtaining a cement comprising the elastomeric polymer in a solvent,
(c) dispersing a layered filler in the cement wherein the layered filler is slurried in either a solvent or water thereby creating an elastomeric composite cement or a solvent-rich elastomeric composite emulsion;
(d) stripping the composite cement or emulsion with water, steam, or a combination thereof to produce a solvent-lean slurry comprising a crumb of the elastomeric composite, and
(e) adding a tackifying resin to the elastomeric cement, the elastomeric composite cement, the solvent-rich emulsion, the solvent lean slurry, or a combination thereof.

In an embodiment, 0.5 phr to about 20 phr, or 1 phr to about 15 phr, or 1.5 phr to about 10 phr of the tackifying resin may be added to the process. In an embodiment, the tackifying resin comprises an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof.

Suitable tackifying resins include, but are not limited to, aliphatic hydrocarbon resins, at least partially hydrogenated aliphatic hydrocarbon resins, aliphatic/aromatic hydrocarbon resins, at least partially hydrogenated aliphatic aromatic hydrocarbon resins, aromatic resins, at least partially hydrogenated aromatic hydrocarbon resins, cycloaliphatic hydrocarbon resins, at least partially hydrogenated cycloaliphatic resins, cycloaliphatic/aromatic hydrocarbon resins, cycloaliphatic/aromatic at least partially hydrogenated hydrocarbon resins, polyterpene resins, terpene-phenol resins, rosin esters, rosin acids, grafted resins, and mixtures of two or more of the foregoing. The tackifiers may be polar or apolar.

In an embodiment, the tackifier component may comprise one or more hydrocarbon resins produced by the thermal polymerization of cyclopentadiene (CPD) or substituted CPD, which may further include aliphatic or aromatic monomers as described later. The hydrocarbon resin may be a non-aromatic resin or an aromatic resin. The hydrocarbon resin may have an aromatic content between 0 wt % and 60 wt %, or between 1% and 60%, or between 1% and 40%, or between 1% and 20%, or between 10% and 20%. In further embodiments, the hydrocarbon resin may have an aromatic content between 15% and 20%, or between 1% and 10%, or between 5% and 10%.

In an embodiment, the tackifier component may comprise hydrocarbon resins produced by the catalytic (cationic) polymerization of linear dienes. Such monomers are primarily derived from Steam Cracked Naptha (SCN) and include $C_5$ dienes such as piperylene (also known as 1,3-pentadiene). Polymerizable aromatic monomers can also be used to produce resins and may be relatively pure, e.g. styrene, -methyl styrene, or from a $C_9$-aromatic SCN stream. Such aromatic monomers can be used alone or in combination with the linear dienes previously described. "Natural" monomers can also be used to produce resins, e.g., terpenes such as alpha-pinene or beta-carene, either used alone or in high or low concentrations with other polymerizable monomers. Typical catalysts used to make these resins are $AlCl_3$ and $BF_3$, either alone or complexed. Mono-olefin modifiers such as 2-methyl, 2-butene may also be used to control the molecular weight distribution (MWD) of the final resin. The final resin may be partially or totally hydrogenated.

In an embodiment, the resin may be at least partially hydrogenated or substantially hydrogenated. As used herein, "at least partially hydrogenated" means that the material contains less than 90% olefinic protons, or less than 75% olefinic protons, or less than 50% olefinic protons, or less than 40% olefinic protons, or less than 25% olefinic protons. As used herein, "substantially hydrogenated" means that the material contains less than 5% olefinic protons, or less than 4% olefinic protons, or less than 3% olefinic protons, or less than 2% olefinic protons. The degree of hydrogenation is typically conducted so as to minimize and avoid hydrogenation of the aromatic bonds.

In an embodiment, the hydrocarbon tackifying resin may comprise one or more oligomers such as dimers, trimers, tetramers, pentamers, and hexamers. The oligomers may be derived from a petroleum distillate boiling in the range of 30-210° C. The oligomers may be derived from any suitable process and are often derived as a byproduct of resin polymerization. Suitable oligomer streams may have number average molecular weights (Mn) between 130 and 500, or between 130 and 410, or between 130 and 350, or between 130 and 270, or between 200 and 350, or between 200 and 320. Examples of suitable oligomer streams include, but are not limited to, oligomers of cyclopentadiene and substituted cyclopentadiene, oligomers of $C_4$-$C_6$ conjugated diolefins, oligomers of $C_8$-$C_{10}$ aromatic olefins, and combinations thereof. Other monomers may be present. These include $C_4$-$C_6$ mono-olefins and terpenes. The oligomers may comprise one or more aromatic monomers and may be at least partially hydrogenated or substantially hydrogenated.

Examples of commercially available tackifier resins include, but are not limited to, ESCOREZ 2203LC, ESCOREZ 1310LC, ESCOREZ 1304, ESCOREZ 5380, and ESCOREZ 5600, manufactured by ExxonMobil Chemical Company; Piccotac 1905 and EASTOTAC H-100, manufactured by Eastman Chemicals; QUINTONE D and QUINTONE U 185, manufactured by Nippon Zeon; MARUKARES R100, manufactured by Maruzen; and WINGTACK EXTRA and WINGTACK PLUS, manufactured by Cray Valley. ESCOREZ 2101, Escorez 5690, and Escorez 2173, manufactured by ExxonMobil Chemical Company; Regalrez 5095, Regalrez 3102, Staybelite Ester 3, and Pentalyn H, manufactured by Eastman Chemicals; Quintone U 190, manufactured by Nippon Zeon; Wingtack 86, manufactured by Cray Valley; and Sylvalite RE 885 and Sylvatac RE 85, available from Arizona Chemical.

In an embodiment, the tackifying resin may comprise a combination of different tackifying resins, each having a different melting point and/or affinity for the elastomeric composite. In addition, different tackifying resins may be added at different points in the process, for example, a first tackifying resin may be added to the elastomer cement, a second tackifying resin may be added to the elastomeric composite cement, a third tackifying resin may be added to the solvent rich elastomeric composite slurry, and/or a fourth tackifying resin may be added to the solvent-lean slurry after the steam stripping to remove the solvent.

In an embodiment, the tackifying resin has a glass transition temperature that is greater than a glass transition temperature of the elastomeric composite, and/or the tackifying resin may have a softening point of less than 125° C.

In an embodiment, the solvent-rich slurry consists essentially of the elastomeric composite cement, the tackifying resin, and water.

In an embodiment, both methods of improving the elastomeric composite crumb size may be combined, wherein the tackifying resin is added to a process wherein the solvent-lean slurry is essentially free, or comprises less than about 0.5 phr, of a salt of a $C_8$ to $C_{20}$ carboxylic acid. In such an embodiment, any one or any combination of the disclosed features regarding the tackifying resin may be employed to produce the elastomeric composite crumb.

In an embodiment, the process according to one or more embodiments disclosed herein, using either or both disclosed methods, produces an elastomeric composite crumb having a crumb particle size distribution in the solvent-lean slurry comprising at least 50 weight percent of particles having a size greater than about 0.64 cm, and/or comprising less than 50 weight percent of particles having a particle size of less than 0.33 cm, and/or comprising less by weight of particles having a size less than 0.33 cm than particles having a size from about 0.33 to 1.3 cm. In an embodiment, the process may further comprise drying the solvent-lean slurry to a moisture level below 1 phr. In any embodiment, the desired crumb size should not be greater than 3.5 cm. For all embodiments, the crumb/particle size is based on the maximum dimension of the particle and may also be referred to as the nominal diameter.

In an embodiment, the elastomeric composite produced according to the instant disclosure comprises one or more layered fillers dispersed within one or more elastomers, wherein the elastomeric composite comprises less than about 0.5 phr, or is essentially free, of a salt of a $C_8$ to $C_{20}$ carboxylic acid; or wherein the elastomeric composite comprises from about 0.5 to about 20 phr of a tackifying resin; or a combination thereof.

In an embodiment, the elastomeric composite comprises an elastomeric nanocomposite. In an embodiment, the layered filler of the elastomeric composite is a nanofiller comprising silicates, graphenes, carbon nanotubes, expandable graphite oxides, carbonates, nanoclays, metal oxides, talcs, or a combination thereof, wherein the nanofiller has a maximum dimension in the range of from about 0.0001 μm to about 100 μm.

In an embodiment, the elastomeric composite has a crumb particle size distribution comprising at least 50 weight percent of particles having a size greater than about 0.64 cm, or a crumb particle size distribution comprising less than 50 weight percent of particles having a particle size of less than 0.33 cm, or a crumb particle size distribution comprising less by weight of particles having a size less than 0.33 cm than particles having a size from 0.33 to 1.3 cm. In an embodiment, the elastomeric composite has a moisture level below 1 phr. In any embodiment, the desired crumb size should not be greater than 3.5 cm.

Secondary Rubber Component

In an embodiment, the composite may comprise a secondary rubber or "general purpose rubber" component. Suitable rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, poly(isobutylene-co-p-methylstyrene) and halogenated poly(isobutylene-co-p- methylstyrene), such as, for example, terpolymers of isobutylene derived units, p-methylstyrene derived units, and p-bromomethylstyrene derived units, and mixtures thereof.

In an embodiment, the secondary rubber may include a semi-crystalline copolymer ("SCC"), which is a thermoplastic copolymer of ethylene, propylene and/or 1-butene derived units and optionally other C4 to C16 alpha-olefin or styrene derived units, wherein the SCC has some degree of crystallinity, characterized for example by a heat of fusion from 9 to 50 J/g, or from 15 to 25 J/g, as determined by DSC.

In an embodiment, a secondary rubber component is present in the elastomer composition in addition to the primary polymer at less than 90 phr, or 70 phr, or 50 phr, or 40 phr, or 30 phr based on the total rubber content. The minimum amount of secondary rubber component, if present, is 2 phr, or 5 phr, or 10 phr, where the limits may include any combination of any upper phr limit and any lower phr limit.

Fillers, Additives, Curatives, and Additional Components

In an embodiment, elastomeric composites may also include one or more additional filler components such as calcium carbonate, titanium dioxide, silica, clay, talc, and carbon black. As used herein, the term "filler" does not include layered fillers or other nanofillers forming part of the nanocomposite matrix as explained above, e.g. particles having a dimension in the nanometer range. However, larger clay particles can be used as a filler in a compounded nanocomposite composition, if desired. In an embodiment, the filler is carbon black or modified carbon black. Suitable examples include a semi-reinforcing grade carbon black present at a level of from 10 to 150 phr, or 30 to 120 phr. Useful grades of carbon black range from N110 to N990. Embodiments of carbon black useful in, for example, tire treads are N229, N351, N339, N220, N234, and N110 provided in ASTM D3037, D1510, and D3765. Carbon black grades useful in tire sidewalls are for example N330, N351, N550, N650, N660, and N762. Carbon black grades useful in tire innerliners are for example N550, N650, N660, N762, and N990.

In an embodiment, elastomeric composite compositions may optionally include curative systems which are capable of curing the functionalized elastomeric copolymer component to provide vulcanizable compositions. Suitable curative systems are known in the art and include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylenebismaleimide), Zisnet (2,4,6-trimercapto-5-triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

In an embodiment, elastomeric composite compositions may also include processing additives, such as processing or extender oils or other processing aids. Processing aids may be low number average molecular weight (less than 15,000 Mn) olefin homo- or copolymers, the olefin having from 3 to 8, or from 4 to 6 carbon atoms, or polybutenes. Commercial examples are the PARAPOL™ series of processing oils (ExxonMobil Chemical Company, Houston, Tex.), such as PARAPOL™ 450, 700, 950, 1300, 2400, and 2500. The compositions of this disclosure may also include one or more other polyalphaolefins or isoparaffins as non-functionalized plasticizers. The elastomeric composites may also contain other conventional additives such as dyes, pigments, antioxidants, heat and light stabilizers, plasticizers, oils and other ingredients as known in the art.

In an embodiment, blending of the additional reinforcing fillers, additives, curative components and other components if used, may be carried out by combining the desired components and the elastomeric composite in any suitable mixing device such as a Banbury™ mixer, Brabender™ mixer or a mixer/extruder and mixing at temperatures in the range of 120° C. up to 300° C. under conditions of shear sufficient to allow the components to become uniformly dispersed within the elastomeric composite composition.

In an embodiment, compositions of the composites disclosed herein may be extruded, compression molded, blow molded, injection molded, and laminated into various shaped articles including fibers, films, laminates, layers, industrial parts such as automotive parts, appliance housings, consumer products, packaging, and the like. The composites as described herein may be used in the manufacture of air membranes such as innerliners, innertubes sidewalls, treads, bladders, and the like used in the production of tires. Methods and equipment used to manufacture the innerliners and tires are well known in the art. The instant disclosure is not limited to any particular method of manufacture for articles such as innerliners or tires.

In an embodiment, the elastomeric composite may be employed in air cushions, pneumatic springs, air bellows, hoses, accumulator bags, and belts such as conveyor belts or automotive belts. They are useful in molded rubber parts and find wide applications in automobile suspension bumpers, auto exhaust hangers, and body mounts. Additionally, elastomeric composites disclosed herein may be used as adhesives, caulks, sealants, and glazing compounds. They are also useful as plasticizers in rubber formulations; as components to compositions that are manufactured into stretch-wrap films; as dispersants for lubricants; and in potting and electrical cable filling materials.

Embodiments

The instant disclosure, accordingly, provides the following embodiments:

A. A process comprising
polymerizing one or more olefins in the presence of a catalyst to obtain a polymer;
obtaining a cement comprising the polymer in a solvent;
dispersing a filler in the cement to produce an elastomeric composite in a mixture;
stripping the mixture containing the elastomeric composite with water, steam, or a combination thereof to produce a solvent-lean slurry comprising a crumb of the elastomeric composite,
wherein the solvent-lean slurry is essentially free from, or comprises less than about 0.5 phr of a salt of a $C_8$ to $C_{20}$ carboxylic acid.

B. A process comprising:
polymerizing one or more olefins in the presence of a catalyst to obtain a polymer;
obtaining a cement comprising the polymer in a solvent;
dispersing a filler in the cement to produce an elastomeric composite mixture;
stripping the elastomeric composite mixture with water, steam, or a combination thereof to produce a solvent-lean slurry comprising a crumb of the elastomeric composite, adding a tackifying resin to the elastomeric cement, the elastomeric composite mixture, the solvent lean slurry, or any combination thereof.

C. The process according to embodiment A or B, wherein the crumb has a crumb particle size distribution in the solvent-lean slurry comprising at least 50 weight percent of particles having a size greater than about 0.64 cm.

D. The process according to any one or any combination of embodiments A to C, wherein crumb particle size distribution comprises less than 50 weight percent of particles having a particle size of less than 0.33 cm.

E. The process according to any one or any combination of embodiments A to D, wherein the crumb particle size distribution comprises less by weight of particles having a size less than 0.33 cm than particles having a size from 0.33 to 1.3 cm.

F. The process according to any one or any combination of embodiments A to E, further comprising drying the solvent-lean slurry to a moisture level below 1 phr.

G. The process according to any one or any combination of embodiments A to F, wherein the elastomeric composite is an elastomeric nanocomposite.

H The process according to any one or any combination of embodiments A to G, wherein the mixture comprising the elastomeric composite is i) a solvent-rich slurry or emulsion of water, solvent, the elastomeric composite, or is ii) an elastomeric composite cement of elastomeric composite and solvent.

I. The process according to any one or any combination of embodiments A to H, comprises adding from 0.5 to 20 phr of a tackifying resin to the elastomeric cement, the mixture containing the elastomeric composite, the solvent-lean slurry, or any combination thereof.

J. The process according to any one or any combination of embodiments B to I, wherein the tackifying resin comprises an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof.

K. The process according to any one or any combination of embodiments B to J, wherein the tackifying resin has a glass transition temperature that is greater than a glass transition temperature of the elastomeric composite, wherein the tackifying resin has a softening point of less than 125° C., or a combination thereof.

L. An elastomeric composite crumb comprising:
one or more layered fillers dispersed within one or more elastomers, wherein the elastomeric composite comprises less than about 0.5 phr, or is essentially free of a salt of a $C_8$ to $C_{20}$ carboxylic acid.

M. An elastomeric composite crumb comprising:
one or more layered filler dispersed within one or more elastomers, wherein the elastomeric composite comprises from a tackifying resin.

N. The elastomeric composite crumb according to embodiment L or M, wherein the elastomeric composite crumb is an elastomeric nanocomposite crumb.

O. The elastomeric composite crumb according to any of embodiments L to N, having a crumb particle size distribution comprising at least 50 weight percent of particles having a size greater than about 0.64 cm.

P. The elastomeric composite crumb according to any one of embodiments L to 0 having a crumb particle size distribution comprising less than 50 weight percent of particles having a particle size of less than 0.33 cm.

Q. The elastomeric composite crumb according to any one of embodiments L to P, having a crumb particle size distribution comprising less by weight of particles having a size less than 0.33 cm than particles having a size from about 0.33 to 1.3 cm.

R. The elastomeric composite crumb according to any one of embodiments L to Q, having a moisture level below 1 phr.

S. An elastomeric composite crumb according to embodiment L or R, wherein the crumb comprises from 0.5 to 20 phr of a tackifying resin.

T. The process or elastomeric composite crumb according to any one or any combination of embodiments A to S, wherein the polymer or elastomer comprises isobutylene rubber, halogenated isobutylene rubber, butyl rubber, halogenated butyl rubber, star-branched butyl rubber, halogenated star-branched butyl rubber, isobutylene-co-p-methylstyrene rubber, halogenated isobutylene-co-p-methylstyrene rubber, natural rubber, isoprene rubber, epoxylated natural rubber, styrene butadiene rubber, hydrogenated styrene butadiene rubber, polybutadiene rubber, nitrile butadiene rubber, hydrogenated nitrile butadiene rubber, ethylene propylene rubber, ethylene propylene diene rubber, maleic acid-modified ethylene propylene rubber, acrylic rubber, chloroprene rubber, hydrin rubber, chlorosulfonated polyethylene rubber, chlorinated polyethylene rubber, maleic acid-modified chlorinated polyethylene rubber, methylvinyl silicone rubber, dimethyl silicone rubber, methylphenylvinyl silicone rubber, polysulfide rubber, vinylidene fluoride rubber, tetrafluoroethylene-propylene rubber, fluorine-containing silicone rubber, acrylonitrile-butadiene rubber, or combinations thereof.

U. The process or elastomeric crumb composite according to any one or any combination of embodiments A to T, wherein the layered filler comprises a nanofiller comprising silicates, graphenes, carbon nanotubes, expandable graphite oxides, carbonates, nanoclays, metal oxides, talcs, or a combination thereof, wherein the nanofiller has a maximum dimension in the range of from about 0.0001 μm to about 100 μm.

EXAMPLES

The following examples were prepared consistent with the instant disclosure

Carboxylic Acid Salt Free Process

Comparative Example A1

A BIMS-clay nanocomposite solution was prepared using a solvent solution mixing process in a pilot plant. During preparation of the composite, per typical elastomeric polymer processes as described in *Rubber Technology*, about 1.2 phr calcium stearate was added to the solution mixture. The cement was hot-water-stripped in two stirred tank reactors in series. Elastomeric composite crumb was sampled and sorted by four sieve screens of different mesh size. The composite crumb on each screen was recovered and weighed to determine the crumb size distribution. About 69 wt % of the crumb had a nominal diameter of less than 0.33 cm. About 95 wt % of the crumb had a nominal diameter of less than 0.64 cm.

Example A2

A BIMS-clay nanocomposite solution was prepared in a manner identical to Example A1 excluding the addition of the calcium stearate; no other aggolomeration additive was provided to the cement or composite. Composite crumb was sampled and sorted by four sieve screens of different mesh size. The crumb on each screen was recovered and weighed to determine the crumb size distribution. About 26 wt % of the crumb had a nominal diameter of less than 0.33 cm. About 69 wt % had a nominal diameter of less than 0.64 cm.

The crumb size data for both comparative example A1 and example A2 is shown in FIG. 1. As seen in the graph of FIG. 1, the amount of 'small' elastomeric crumb was reduced by more than fifty by the exclusion of metal stearate, while the amount of desirable crumb size, that ranging from 0.33 cm to 3.5 cm maximum dimension, is more than doubled. The method of producing elastomer composite crumb by eliminating the conventional inclusion of metal stearate improved the production of the crumb.

Inclusion of Tackifying Resin

Comparative Example B1

A BIMS-clay nanocomposite solution was prepared in the laboratory using a solvent solution mixing process. The BIMS elastomer was prepared using conventional polymer manufacturing techniques and the elastomer was dissolved in solvent to create the cement for preparation of the nanocomposite solution. After sufficient agitation to create the elastomeric composite, the solution was hot-water-stripped at 95-100° C. and 1 atm under vigorous agitation. The composite crumb was recovered and sorted by four sieve screens of different mesh size. The crumb on each screen was recovered and weighed to determine the crumb size distribution, the results are shown in the graph of FIG. 2.

Using the BIMS elastomer conventionally prepared elastomer, the amount of undesirable very small crumb, that having a nominal diameter of less than 0.33 cm, was greater than 70 wt % of the obtained crumb. About 95 wt % of the crumb had a nominal diameter of less than 0.64 cm. These bench-top laboratory results are consistent with the pilot plant work of comparative example A1.

Example B2

A BIMS-clay nanocomposite solution was prepared essentially identical to Example B1, with the inclusion of 10 phr of Escorez™ 5320 resin (124° C. Softening Point) being dissolved into the elastomeric composite cement. The resulting solution was batch hot-water-stripped at 95-100° C. and 1 atm under vigorous agitation essentially identical to Example B1. The elastomeric composite crumb was recovered and sorted by four sieve screens of different mesh size. The crumb on each screen was recovered and weighed to determine the crumb size distribution; the results are shown in FIG. 2.

For example B2, about 35 wt % of the crumb had a nominal diameter of less than 3.3 mm; in comparison to B1 crumb size, this is a reduction of almost fifty percent of undesirable very small nominal diameter crumb. The amount of composite crumb having a nominal diameter in the range of 0.22 to 1.27 cm was more than double the amount in the same size range as the crumb of comparative example B1. In total, about ninety-five percent of the crumb had a nominal diameter of less than 0.64 cm.

Example B3

A BIMS-clay nanocomposite solution was prepared essentially identical to Example B1, and was batch hot-water-stripped at 95-100° C. and 1 atm under vigorous agitation essentially identical to Example B1. A 31 wt % solution of Escorez™ 5320 resin (124° C. Softening Point) in hexane, equivalent to 10 phr, was then added to the stripping vessel under agitation. The elastomeric composite was recovered and sorted by four sieve screens of different mesh size. The crumb on each screen was recovered and weighed to determine the crumb size distribution; the results are shown in FIG. 2.

Just over 17 wt % of the crumb had a nominal diameter of less than 0.33 cm. About 52 wt % of the crumb had a nominal diameter of less than 0.64 cm. Accordingly, larger crumb was produced relative to examples B1 and B2.

Example B4

A BIMS-clay nanocomposite solution was prepared essentially identical to Example B1, with the inclusion of 10 phr of Escorez™ 5380 resin (86° C. Softening Point) was dissolved into the elastomeric composite cement. The resulting solution was batch hot-water-stripped at 95-100° C. and 1 atm under vigorous agitation essentially identical to Example B1. The elastomeric composite crumb was recovered and sorted by four sieve screens of different mesh size. The crumb on each screen was recovered and weighed to determine the crumb size distribution. The data is shown in FIG. 2.

About 25 wt % of the crumb had a nominal diameter of less than 0.33 cm. About 65 wt % of the crumb had a nominal diameter of less than 0.64 cm. Accordingly, the average size of the crumb was greatly enhanced relative to Example B1.

Example B5

A BIMS-clay nanocomposite solution was prepared essentially identical to Example B1, and was batch hot-water-stripped at 95-100° C. and 1 atm under vigorous agitation essentially identical to Example B1. A 31 wt % solution of Escorez™ 5380 resin (86° C. Softening Point) in hexane, equivalent to 10 phr, was then added to the stripping vessel under agitation. The elastomeric composite crumb was recovered and sorted by four sieve screens of different mesh size. The crumb on each screen was recovered and weighed to determine the crumb size distribution.

Essentially 0 wt % of the crumb had a nominal diameter of less than 0.33 cm. About 9 wt % of the crumb had a nominal diameter of less than 0.64 cm. Accordingly, the average size of the crumb was greatly enhanced relative to Example B1. The data are shown in FIG. 2.

The selection of a tackifier resin having a glass transition which is higher than the glass transition temperature of the elastomer is also known to reduce the gas permeability of the elastomeric nanocomposite.

As the data of FIG. 2 shows inclusion of a tackifier hydrocarbon resin when preparing an elastomeric composite wherein the elastomer has been prepared with the inclusion of a metal stearate improves crumb size, and the date of FIG. 1 shows the improvement of crumb when using an elastomer that has been prepared in the absence of any metal stearate one skilled in the art will readily appreciate that for an example of an elastomer prepared using both improvement methods, the resulting elastomer composite will produce crumb having a nominal diameter size distribution predominately in the range of 0.33 to 1.27 cm. Thus, while it is not essential to the present invention to use both methods together to produce a desired crumb size for the elastomeric composite, such a combination of methods will produce a desirable commercial product.

All priority documents, patents, publications, and patent applications, test procedures (such as ASTM methods), and other documents cited herein are fully incorporated by reference to the extent such disclosure is not inconsistent with this disclosure and for all jurisdictions in which such incorporation is permitted. When numerical lower limits and numerical upper limits are listed herein, ranges from any lower limit to any upper limit are contemplated.

The following is claimed:

1. A process to produce an elastomeric composite crumb comprising:
    polymerizing one or more olefins in the presence of a catalyst to obtain an elastomeric polymer;
    obtaining a cement comprising the elastomeric polymer in a solvent;
    dispersing a layered filler in the cement to produce an elastomeric composite mixture;
    stripping the elastomeric composite mixture with water, steam, or a combination thereof to produce a solvent-lean slurry comprising a crumb of the elastomeric composite; and
    recovering the elastomeric composite crumb from the solvent-lean slurry,
    wherein the elastomeric composite crumb has a crumb particle size distribution in the solvent-lean slurry wherein less than 25 weight percent of crumb particles has a nominal diameter less than 0.33 cm and less than 65 weight percent of crumb particles has a nominal diameter less than 0.64 cm, and
    wherein the solvent-lean slurry comprises less than 0.5 phr of a salt of a $C_8$ to $C_{20}$ carboxylic acid; and
    wherein the process further comprises adding from 0.5 to about 20 phr of a tackifying resin to the cement, the elastomeric composite mixture, the solvent-lean slurry, or a combination thereof.

2. The process of claim 1, wherein the solvent-lean slurry and the elastomeric composite crumb therein comprises less than 0.5 phr of a metal stearate.

3. The process of claim 1, wherein the elastomeric polymer obtained by the polymerization is selected from the group consisting of isobutylene rubber, halogenated isobutylene rubber, butyl rubber, halogenated butyl rubber, star-branched butyl rubber, halogenated star-branched butyl rubber, isobutylene-co-p-methylstyrene rubber, halogenated isobutylene-co-p-methylstyrene rubber, natural rubber, isoprene rubber, epoxylated natural rubber, styrene butadiene rubber, hydrogenated styrene butadiene rubber, polybutadiene rubber, nitrile butadiene rubber, hydrogenated nitrile butadiene rubber, ethylene propylene rubber, ethylene propylene diene rubber, maleic acid-modified ethylene propylene rubber, acrylic rubber, chloroprene rubber, chlorosulfonated polyethylene rubber, chlorinated polyethylene rubber, maleic acid-modified chlorinated polyethylene rubber, methylvinyl silicone rubber, dimethyl silicone rubber, methylphenylvinyl silicone rubber, polysulfide rubber, vinylidene fluoride rubber, tetrafluoroethylene-propylene rubber, fluorine-containing silicone rubber, acrylonitrile-butadiene rubber, and combinations thereof.

4. The process of claim 1, wherein the layered filler is selected from the group consisting of silicates, graphenes, carbon nanotubes, expandable graphite oxides, graphite, carbonates, nanoclays, metal oxides, talcs, and combinations thereof.

5. The process of claim 4, wherein the layered filler is a nanofiller having a maximum dimension in the range of from about 0.0001 µm to about 100 µm.

6. The process of claim 1, wherein the elastomeric composite mixture is either an elastomeric composite cement or a solvent-rich elastomeric composite emulsion comprising cement and water.

7. The process of claim 1, wherein the crumb particle size distribution comprises less by weight of particles having a size less than 0.33 cm than particles having a size from about 0.33 to 1.3 cm.

8. The process of claim 1, wherein the tackifying resin comprises an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof.

9. The process of claim 8, wherein the tackifying resin has a) a glass transition temperature that is greater than a glass transition temperature of the elastomeric composite, b) a softening point of less than 125° C., or a c) combination of the greater glass transition temperature and softening point.

* * * * *